3,813,259
PREPARATION OF RESIN ENCAPSULATED CRUMB RUBBER
Terry C. Neubert, Kent, Ohio, assignor to The Goodyear Tire & Rubber Company, Akron, Ohio
Filed Apr. 7, 1972, Ser. No. 242,022
Int. Cl. B44d 1/02
U.S. Cl. 117—100 C                                    4 Claims

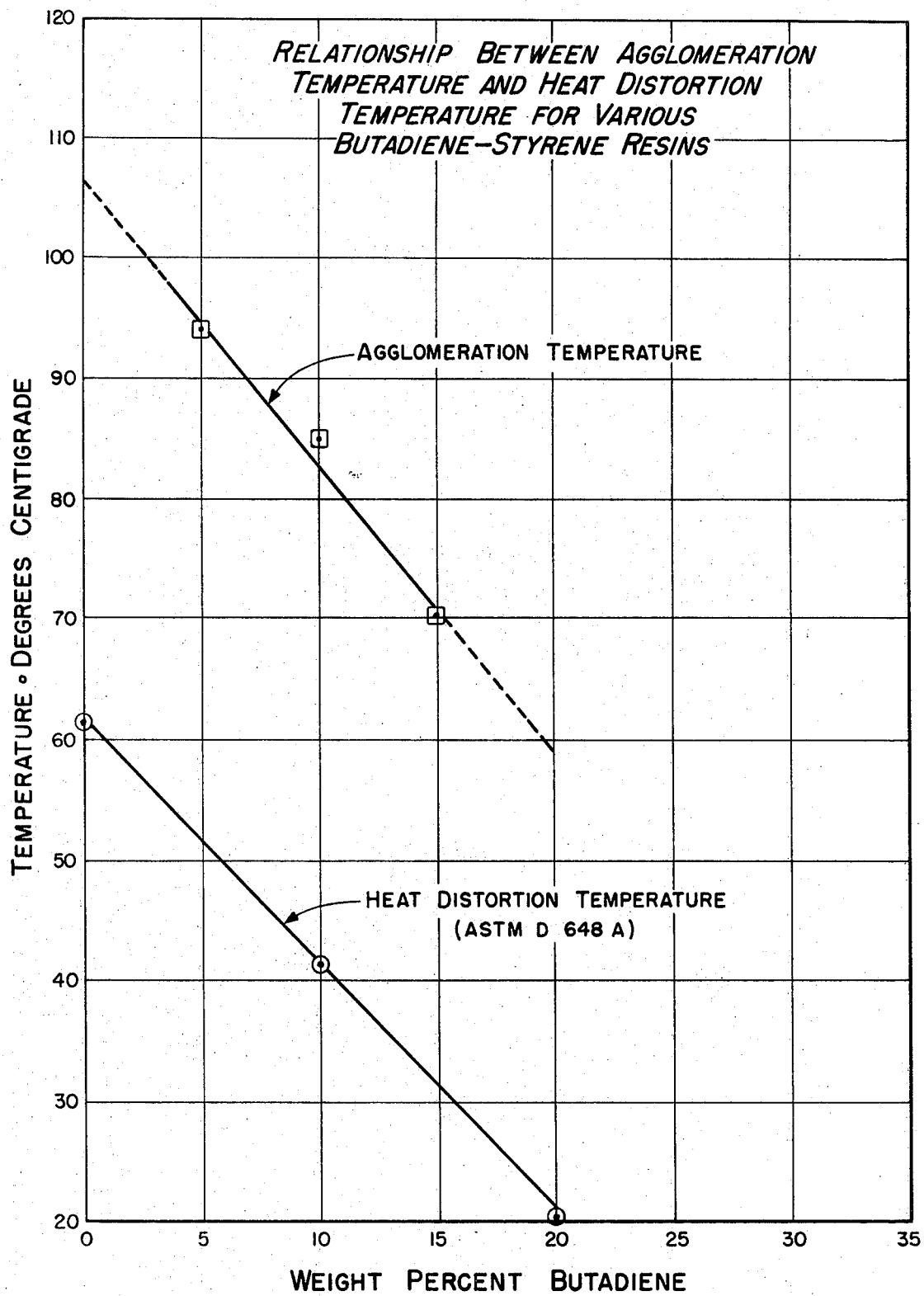

ABSTRACT OF THE DISCLOSURE

A resinous, dust-free, semicontinuous, adherent coating-type partitioning agent for elastomeric crumb or elastomer bonded particles is prepared by slowly adding together a dilute resin latex and a dilute coagulating agent (the elastomeric particulate being slurried in one or the other of these ingredients) at a temperature near or above the agglomerating temperature of the resin. Under these conditions, the resin coagulates slowly and is coincidentally deposited on the surface of the elastomeric particles, becoming sintered so that essentially none of the resin is free to form a separate phase. Preferred coating resins are styrenebutadiene copolymers containing at least 80% styrene. Three to ten percent of resin by weight of product provides adequate partitioning under normal conditions.

BACKGROUND OF THE INVENTION

The present invention relates to a process for obtaining solid elastomeric products in the form of dry, non-adhesive particles that do not conglomerate during storage, do not contain large amounts of unwanted discrete resin particles, and which do not experience flaking or separation of the resin coating from the elastomer during storage and handling. In many manufacturing operations it is convenient to ship and handle elastomers in small particles which, according to their size and/or configuration, are referred to as powder, crumb, or pellets. Such elastomers may be gum rubber or a masterbatch which includes oil, carbon black, silica, clay, or other fillers, or various compounding materials. In addition to these conventional masterbatches, compounding materials may be pelletized with an elastomeric binder for convenience in handling and to eliminate dust hazards. The difficulty experienced in using such materials is that the elastomer or elastomeric binder conglomerates during processing operations, and/or during shipment or storage.

One early method used to overcome the problem of conglomeration was the addition of organic or inorganic dusts or powders which partition the elastomeric particles from one another. This procedure usually results in a product in which the fine partitioning agent separates from the larger elastomer particles resulting in a non-homogeneous, dusty product. This dusty product often cannot be satisfactorily processed in conventional manufacturing equipment because of the dust conditions which may produce a health or fire hazard and further because of the non-homogeneous product which may result.

Another method used to overcome the conglomeration problem is to coat solid elastomeric particles, such as the powder, crumb, or pellets referred to hereinabove, with a resin coating in order to prevent conglomeration of the particles during storage or handling. Here again a difficulty with the techniques taught to date is that coagulating a resin latex in a slurry of coagulated elastomeric crumb may form a finely divided precipitated resin partitioning agent for the elastomeric particles wherein most of the resin exists as a separate phase. In addition, the adhered coating resin tends to flake off or separate from the elastomeric particle. Both such resin particles, which collect in the bottom of the storage container, are referred to as "fines." Large amounts of such resin, frequently a majority thereof, separate in this manner and collect in the container. Two detrimental results ensue from the presence of resin fines. First, the ability of the elastomeric particles not to conglomerate is diminished or lost. Second, when processing such material the resin fines tend to concentrate in the end product resulting in a non-homogeneous material with a high resin content in discrete areas.

A closely related problem in rubber processing plants is the potential health hazard which may result from the dust of chemical compounding materials. One approach to resolving this problem has been to blend such materials with the elastomer (e.g. 10 to 50% or more by weight) to which they are subsequently to be compounded, and thereafter forming them into small, readily handleable particles such as chips or pellets. The difficulty in such procedure is that the chips or pellets so formed tend to conglomerate during processing and storage. The subject invention is equally useful in solving this problem also.

SUMMARY OF THE INVENTION

According to the present invention, the foregoing problems with known techniques of resin coating elastomer particles is overcome and resin adhesion to such particles will be accomplished and maintained during storage and handling in the amount of at least 90% by weight, and generally in excess of 98% by weight, of the applied resin as a result of applying the resin by slowly adding together a dilute resin latex and a dilute coagulating agent (the elastomeric particulate being slurried in one or the other of these ingredients) at a temperature near or above the agglomerating temperature of the resin and below the lower of the melting or decomposition temperature of such resin.

DRAWING

The drawing shows the relationship between the agglomeration temperature of one type resin, namely a high styrene-butadiene resin, and the heat distortion temperature of that resin when determined by ASTM D 648 A. The heat distortion temperature values are generally available in the literature for most commercial resins and the agglomeration temperature plot roughly parallels the heat distortion temperature plot. Consequently, if even one agglomeration point is determined, the agglomeration temperature for other resin compositions formed from the same monomers can be estimated with sufficient precision for practicing the invention. However, it should be understood that this procedure is merely suggested for expediency and the preferred way of ascertaining the agglomeration temperature is to heat the dilute resin and observe the temperature at which the agglomeration is visible.

DETAILED DESCRIPTION

The elastomers to which the invention is particularly applicable are styrene/butadiene rubber, acrylonitrile/butadiene rubber, polybutadiene and polyisoprene. Other elastomers which may be utilized in particulate form and which conglomerate on standing are also aided by the application of a resin coating. As previously noted, such rubbers may be in powder, crumb, or pellet form and may or may not include oil, carbon black, silica, clay, or other fillers, or compounding materials. The particles may also be primarily the compounding material and/or filler bonded together with the elastomer.

The coating resins useful in practicing this invention are those which have been conventionally applied to this purpose and include styrene/butadiene copolymer, styrene/butadiene/divinylbenzene terpolymers, acrylonitrile/styrene/butadiene terpolymers, polyvinyl chloride, polystyrene and polymethyl methacrylate. A particular preferred resin which often yields a frosted appearance in the final product is a styrene/butadiene copolymer containing 80–99% by weight of styrene. These resins may be prepared by well know emulsion polymerization techniques in latex form appropriate for the practice of this invention. It is preferable to use a resin that is compatible with the eventual use of the product and also one that does not become ineffective as a partitioning agent by absorption of, or solution into, the crumb or ingredients thereof. For instance, a soluble styrene/butadiene (S/B) resin may absorb oil from, or dissolve in, the crumb of a rubber/oil masterbatch and thereby lose its effectiveness as a partitioning agent. On the other hand, crumb rubber without oil is often used in the preparation of adhesives and the entire mixture must be soluble. Since many soluble resins, useful in the practice of this invention, melt to fluid liquids at elevated temperatures, efficient resin coating of crumb can be done with these resins only below their respective melting temperatures but above temperatures that are not more than about 5° C. below their respective agglomerating temperatures. Resin in the amount of 1–25% by weight of the particles being coated is sufficient to obtain the desired result and usually 3–10% provides adequate partitioning. Larger quantities of resin may be used but the addition of such larger quantities normally has an undesirable effect on the elastomer properties. The amount of resin coating will also vary with the size of the elastomeric particle, the smaller the particle the larger the amount of resin is required to effect adequate partitioning of the larger surface area.

The coagulants employed are likewise presently known and the final choice may depend upon the type of surfactant used in the resin latex. Examples of suitable coagulants for the elastomers are dilute solutions (0.01 to about 10%, preferably 0.1 to 2% by weight) of $Al_2(SO_4)_3$, $MgSO_4$, $CaCl_2$, $CaO$ and $Ba(OH)_2$. Suitable emulsifiers are fatty acid soap or commercially available sulfonate, phosphate or sulfate surfactants or mixtures of surface active agents.

Any conventional coagulating or pelletizing technique is suitable. Generally it is preferable to keep the elastomer particles in an aqueous slurry until after they are resin coated. During the coating process it is desirable to have the resin latex at a low total solids content (0.1–8% by weight) before contact with the dilute coagulant so that coagulation occurs slowly with coincident deposition of the resin on the surfaces of the elastomer particles, and as previously noted, coating is carried out at a temperature near or above the resin agglomeration temperature and below the lower of the melting or decomposition temperature of such resin.

The agglomeration temperature is that temperature at which fine particles of the resin slurried in water will fuse and collect into larger aggregates. The figure shows the agglomeration temperature and the Heat Distortion Temperature (HDT, ASTM D648A) for a particular group of styrene/butadiene resins. The agglomeration temperature is believed to be dependent on diverse polymer characteristics including one or more of the following: the chemical nature of the resin, the molecular weight of the resin, the molecular weight distribution and the degree of crosslinking or branching. Since there are hundreds of possible variations of the resin, it is preferable to run an agglomeration temperature on representative samples of each type of resin so that the desired coating temperature for a particular resin can be selected. It is also possible to prepare samples of product at various temperatures and by observation of the products determine a suitable operating temperature. The relation shown in the figure between the agglomeration temperature and the HDT is not universally applicable but may be a guideline if the HDT is available. In any event, the slurry of elastomer particles must be hot enough so that the resin will fuse both to the elastomer and itself without actually melting, an action corresponding to sintering.

The temperature of the resin/elastomer mix during coating may vary somewhat from the agglomeration temperature. It may drop slightly below the resin agglomeration temperature by as much as about 5° C. It may also go well above the resin agglomeration temperature so long as it does not reach the melting or decomposition temperature of the particular resin used, or does not reach the decomposition temperature of the elastomer, or the temperature which results in an undesirable change in any of the compounding ingredients (e.g. to cause a reaction to occur between such ingredients). The invention has been practiced at temperatures as much as 40° C. above the resin agglomeration temperature, hower it is preferable to practice the invention near the agglomeration temperature of the resin.

In the normal commercial production of synthetic rubber and various masterbatches, it is common practice to add the latex, or latex masterbatch, to a hot, dilute coagulant to form a slurry of crumb for the subsequent processing steps. In the practice of the present invention it is often possible to take advantage of the excess coagulant in the slurry for the formation of a resin coating partitioning agent by slowly adding dilute resin latex to this slurry.

The desired results of this invention are obtained when the dilute resin latex coagulates slowly in the slurry of elastomer or elastomer based particles. This is achieved by slowly adding a dilute resin latex, about 0.1 to 8%, preferably 1 to 3%, solids, to the dilute coagulant, about 0.01 to 10%, preferably 0.1 to 2.0%, by weight, in the water in which the particles are slurried. The conditions should be such that the resin latex becomes dispersed throughout the slurry, as may be judged by observing the development of turbidity in the fluid of the slurry, before it actually coagulates. If coagulation occurs rapidly, particles of coagulated resin form a separate phase and do not form the desired partitioning agent coating. Alternatively, the particles may be slurried in the very dilute latex, containing the desired amount of resin, and then upon the slow addition of very dilute coagulant, the resin latex coagulates slowly and nearly simultaneously deposits in the form of a coating on the surfaces of the particles. In any case, the operation is to be carried out at a temperature as low as about 5° C. below, but preferably equal to or above, the agglomerating temperature of the resin latex, as defined herein, to obtain a strongly adhering coating.

EXAMPLES

The following experiments show the improvement that is obtained by using the process of this invention. For the examples carried out at temperatures above the atmospheric boiling point of water, a closed jacketed pressure vessel equipped with a variable speed agitator and automatic temperature control was used. For the examples carried out at lower temperatures, an open vessel equipped with a variable speed agitator and manually controlled steam heating facilities was used. In all cases the resin latex or coagulant was added sufficiently slowly so that the temperature of the slurry containing the elastomeric or elastomer based crumbs or pellets could be maintained within a few degrees C. of the starting level throughout the addition and so that the desired coating of the elastomer particles would result.

The elastomer used in Examples 1 through 14 is cold SBR, 1502 type, (23.5% styrene, 76.5% butadiene, ML 4-212° F. of 62) in latex of 23% solids.

Example 1

The original slurry of elastomeric crumbs is prepared by slowly pouring 2360 g. SBR (1502 type) latex (540 g. dry weight) into an agitated coagulant solution containing 24 g. $Al_2(SO_4)_3 \cdot 18H_2O$ (alum) and 2,000 g. water at 90° C. in the pressure vessel described above. Coagulation occurs and the resultant slurry is heated to 165° C. The excess coagulant in the slurry serves as the coagulant for the resin frosting or coating step. Into this agitated slurry is allowed to flow slowly, from an attached pressurized bomb, 3,000 ml. of a 2% solids PVC (polyvinyl chloride) latex which is at 70° C. This is added at a sufficiently low rate that the automatic temperature control maintains the temperature of the slurry near 165° C., always above 155° C. The PVC coagulates and coincidentally deposits on the surfaces of the slurried elastomer crumbs. After the resin latex addition is completed, the temperature of the slurry is maintained at 165° C. for 5 minutes, then cooled to about 25° C. The crumb rubber is isolated by pouring the slurry onto a 50 mesh screen. The free resin fines, if any, and the serum pass through the screen and the fines are isolated by filtration. The resin fines and elastomeric crumbs are dried separately in an air oven at 65 to 80° C. for about 5 hours and weighed. The free resin, collected by filtration, is reported as percent of total resin added. The product obtained is a resin frosted crumb (particles about ¼" diameter) that contains over 99.5% of the PVC resin as a tightly adherent coating.

Example 2

This example is the same as Example 1 except the crumb slurry is maintained at 110 to 113° C. during addition of the dilute resin latex and held at 113° C. for 5 minutes prior to cooling, instead of 165° C. The product obtained is more like a resin dusted crumb containing less than 20% of the resin loosely adhered to the crumb. Over 80% by weight of the total resin added was collected by filtering the serum that passed through the 50 mesh screen. If these resin fines are not separated (done in this instance for purposes of weighing), the resulting product would be a non-homogeneous mixture of free resin fines and poorly partitioned crumb rubber.

The results of Examples 1 and 2, as well as additional Examples 3 through 14, carried out in a similar manner except for differences noted, are summarized in Table I.

TABLE I.—SUMMARY OF RESULTS USING SBR, 1502 TYPE, WITH VARIOUS RESINS AND CONDITIONS

| Example | Resin [1] | Aggl. temp. °C. | Latex solids, percent | Coating temp., °C. | Resin fines, percent |
|---|---|---|---|---|---|
| 1 | PVC | | 2 | 165 | <0.5 |
| 2 | PVC | | 2 | 113 | >80 |
| 3 | PVC | | 2 | 70 | >80 |
| 4 | PVC | | 35 | 70 | >80 |
| 5 | PS | 106 | 2 | 113 | <0.5 |
| 6 | PS | 106 | 2 | 70 | >90 |
| 7 | PS | 106 | 35 | 70 | >80 |
| 8 | S/B, 95/5 | 94 | 2 | 95 | <0.5 |
| 9 | S/B, 95/5 | 94 | 2 | 70 | >45 |
| 10 | S/B, 95/5 | 94 | 35 | 70 | >80 |
| 11 | S/B, 95/5 | 94 | 35 | 98 | [2] <1 |
| 12 | S/B, 85/15 | 70 | 2 | 70 | <0.5 |
| 13 | S/B, 85/15 | 70 | 2 | 90 | <0.5 |
| 14 | S/B, 85/15 | 70 | 33 | 70 | [2] <1 |

[1] PVC=polyvinyl chloride; PS=polystyrene; S/B, 95/5=styrene/butadiene copolymer, 95/5 monomer ratio.
[2] Although more than 99% of the resin is retained initially by this product, the resin coating is uneven and flakes off on handling, thus failing to protect against agglomeration during storage.

Example 15

A commercial grade polyisoprene, dissolved in hexane to make a 10% solution, is converted to a slurry of crumb by injecting the polyisoprene solution into hot water containing a low level of surface active agent by means of a steam jet which simultaneously volatilizes the solvent. Sufficient crumb to make 180 g. dry product is slurrried in 670 g. water containing 6 g. alum and maintained at 95° C. while 500 ml. of a 2% solids S/B, 92/8, resin latex, at about 70° C., is slowly added. After an additional 5 minutes at 95° C. the slurry is cooled to about 35° C., the product is isolated and dried. Over 99% of the resin is strongly adhered to the approximately ¼" diameter rubber particles as a coating partitioning agent which provides protection against conglomeration during storage and handling.

Example 16

SBR was used as the bonding agent and resin coating as the partitioning agent in the preparation of dustless, free-flowing particles of rubber compounding chemicals as follows: The dry, dusty powdered chemicals were mixed in the proportion by weight of 5 parts zinc oxide, 1 part antioxidant, 1.3 parts sulfur and 0.75 part accelerator. A paste is formed when 500 g. of this mixture is mixed first with 100 ml. water, then with 200 ml. of 21% solids, SBR 1712 type, base latex. After this paste is poured into an agitated coagulant solution consisting of 10 g. $MgSO_4 \cdot 7H_2O$ in 1200 ml. water at 50° C., an additional 300 ml. of 10% solids SBR 1712 type latex is added slowly. The resulting slurry of fine crumb is heated to 65° C. and 2900 ml. of 2% solids, S/B, 85/15, resin latex at 70° C. is slowly added. After 5 minutes additional stirring at 65° C. the slurry is cooled to about 35° C., filtered on a 100 mesh screen, rinsed with water and dried at 55 to 60° C. in an air circulating oven.

Example 17

An oil, carbon black, SBR latex masterbatch is prepared by adding first a dispersion of a highly aromatic rubber processing oil and then a dispersion of HAF black in proportions so there are 37.5 parts oil and 75 parts carbon black per hundred parts rubber by weight (final product ML 4–100° C. of 50). The latex masterbatch is coagulated and the wet crumb put through an extruder that produced pellets approximately ⅛" diameter. Sufficient pellets are taken to make 200 g. dry weight and are slurried in a dilute coagulant consisting of 10 g. $MgSO_4 \cdot 7H_2O$ in 1800 ml. water at 95° C. To this slurry is added slowly 300 ml. of a 2% solids S/B, 92/8, resin latex (agglomerating temperature of 88° C.). The temperature of the slurry is maintained at 95° C. during the addition of the resin latex and for 5 minutes thereafter, then cooled to about 35° C. The pellets are separated from the serum and dried at 60° C. resulting in resin coated pellets containing over 99% of the total resin added as a coating partitioning agent and which are well protected against conglomeration during storage and handling.

Example 18

A 200 g. portion of a bale of 1712 SBR (cold SBR extended with 37.5 parts oil, ML 4–100° C. of 50) is ground into crumb, the individual particles of which are about ⅜" diameter. This crumb is slurried in 1500 ml. water, agitated at 95° C. To this slurry is added 30 g. of 35% solids S/B, 92/8, resin latex (agglomeration temperature 88° C.) resulting in a slurry of elastomeric crumb in 0.7% solids latex. To this is slowly added a dilute coagulating agent made up of 6 g. $MgSO_4 \cdot 7H_2O$ in 300 ml. water. After 5 minutes at 95° C., the slurry is cooled to about 35° C., the crumb isolated and dried. The product thus obtained is a resin coated crumb that is well protected against conglomeration and contains over 99% of the resin added as an adherent coating, partitioning agent.

While certain representative embodiments and details have been shown for the purpose of illustrating the invention, it will be apparent to those skilled in this art that various changes and modifications may be made therein without departing from the spirit or scope of the invention.

What is claimed is:

1. In the process of resin coating elastomeric particulate material of the powder, crumb or pellet type to obtain a dry, non-conglomerating partitioned product wherein a coagulant and a resin latex, the elastomeric particulate being slurried in either the coagulant or the resin latex, are mixed and coagulated, the improvement which comprises employing a dilute resin latex of between 0.1 and 8.0% by weight of resin and a dilute aqueous solution of coagulant of between 0.01 and 10.0% by weight of coagulant at a temperature between about 5° C. under the agglomeration temperature and below the lower of the melting or decomposition temperature of such resin.

2. The process of claim 1 wherein the resin is a styrene/butadiene copolymer containing at least 80% by weight of styrene and the coagulant is $Al_2(SO_4)_3$, $MgSO_4$, $CaCl_2$, $CaO$ or $Ba(OH)_2$.

3. The process of claim 1 wherein the elastomeric particulate is styrene/butadiene or acrylonitrile/butadiene or polyisoprene or polybutadiene rubber.

4. The process of claim 1 wherein the elastomeric particulate is at least one rubber compounding chemical bonded into particulate form by a rubber elastomer.

References Cited
UNITED STATES PATENTS

| | | | |
|---|---|---|---|
| 3,494,784 | 2/1970 | Coene et al. | 117—100 C |
| 3,345,430 | 10/1967 | Simon et al. | 260—29.7 M X |
| 3,049,502 | 8/1962 | Howland et al. | 260—29.7 GP X |
| 3,297,600 | 1/1967 | Blair et al. | 260—892 X |
| 3,669,722 | 6/1972 | Bishop | 117—138.8 UA X |

WILLIAM D. MARTIN, Primary Examiner

D. C. KONOPACKI, Assistant Examiner

U.S. Cl. X.R.

117—100 A